Feb. 27, 1945.　　　L. E. DAVIES　　　2,370,292
TOPPING MACHINE FOR CANNING
Filed Aug. 30, 1940　　　3 Sheets-Sheet 2

INVENTOR.
Lynn E. Davies,
BY
ATTYS.

Feb. 27, 1945.   L. E. DAVIES   2,370,292
TOPPING MACHINE FOR CANNING
Filed Aug. 30, 1940   3 Sheets-Sheet 3

INVENTOR.
Lynn E. Davies,
BY

Patented Feb. 27, 1945

2,370,292

UNITED STATES PATENT OFFICE 2,370,292

TOPPING MACHINE FOR CANNING

Lynn E. Davies, Park Ridge, Ill., assignor to White Cap Company, Chicago, Ill., a corporation of Delaware Application August 30, 1940, Serial No. 354,783

5 Claims. (Cl. 226—71)

This invention relates to apparatus for use in commercial canning practice and the like to press down material which has been filled into cans, jars, and the like, preliminary to the application of heads, caps or other sealing closures to such receptacles.

In the canning of various commodities, certain fruits and vegetables for example, the material placed in the packing receptacles customarily includes a substantial amount of liquid, syrup or the like, in addition to the solids, and the liquid may tend to buoy up some of the solids to such an extent that they might interfere with the seating of the closure or occupy more or less of the head space which it is desired to leave unoccupied. The present apparatus is designed to be employed in the packing line between the filling machine and the closure applying machine and to operate automatically in timed relationship or synchronism with them.

A general object of the present invention is the provision of such an apparatus which will function accurately and effectively to press down the contents in the upper portions of successive packing receptacles while they are being fed past it in uninterrupted progressive movement, so as to obtain approximately uniform spacing of the surface material from the upper rims of the receptacles, and which will operate with accuracy and safety at speeds sufficiently high to obtain a large output per unit of time.

Another object of the invention is the provision of apparatus having the attributes above specified and which is easily and quickly adaptable for operation on receptacles of different heights and different diameters, and which is also adaptable, by simple adjustments, to vary, as desired, the depth of the head space, or unoccupied space, to be left within the receptacle above the surface of its contents.

Another object of the invention is to provide apparatus having the attributes above specified and which is particularly qualified to obtain accurate positioning of the receptacles in relation to the parts of the apparatus which enter them, and which is effective also to avoid injury to the receptacles or upsetting of them on occasions when their accurate positioning may have been interfered with.

Yet another object is the provision of such apparatus which is simple and reliable in construction and operation, free from difficulties of lubrication, safe as to persons who work near it, and which occupies but little space and is easy to keep clean and in a sanitary condition, and which requires but little power.

Other and further objects of the invention will be pointed out hereinafter or will be apparent to one skilled in the art upon an understanding of the following description of it or employment of it in actual practice.

For the purpose of aiding in an explanation of the invention, I show in the accompanying drawings forming a part of this specification, and hereinafter describe, one form in which it may be embodied. It is to be understood, however, that this is presented merely for purpose of illustration, and hence is not to be construed in any fashion for the purpose of limiting the appended claims short of the true and most comprehensive scope of the invention in the art.

Figure 1:
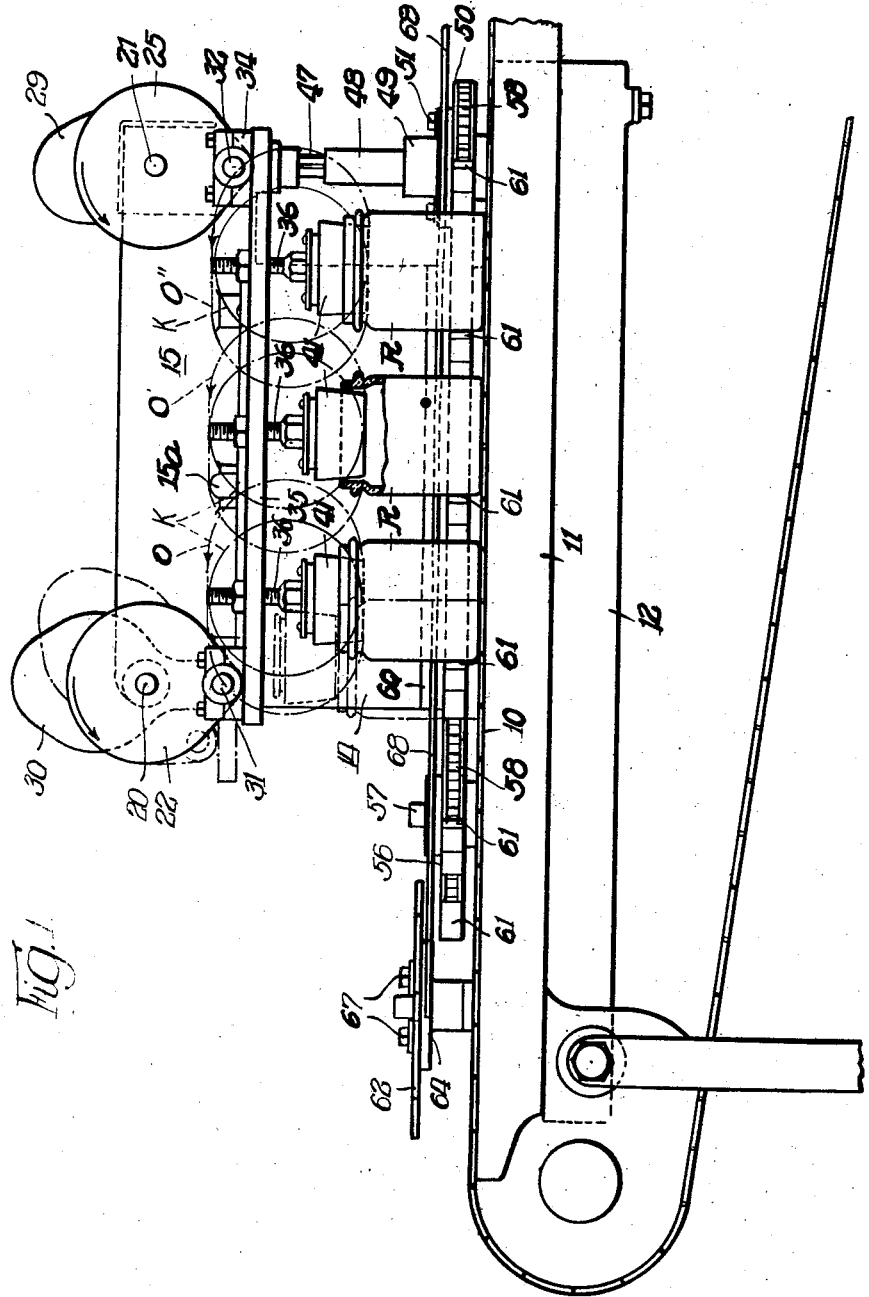
Fig. 1 is a front elevational view of an illustrative embodiment of the invention, but with the front guide rail removed.

The general nature of the invention having been indicated above, a fuller understanding of it may be had from the following detailed description of the illustrative embodiment shown in the drawings.

Figure 4:
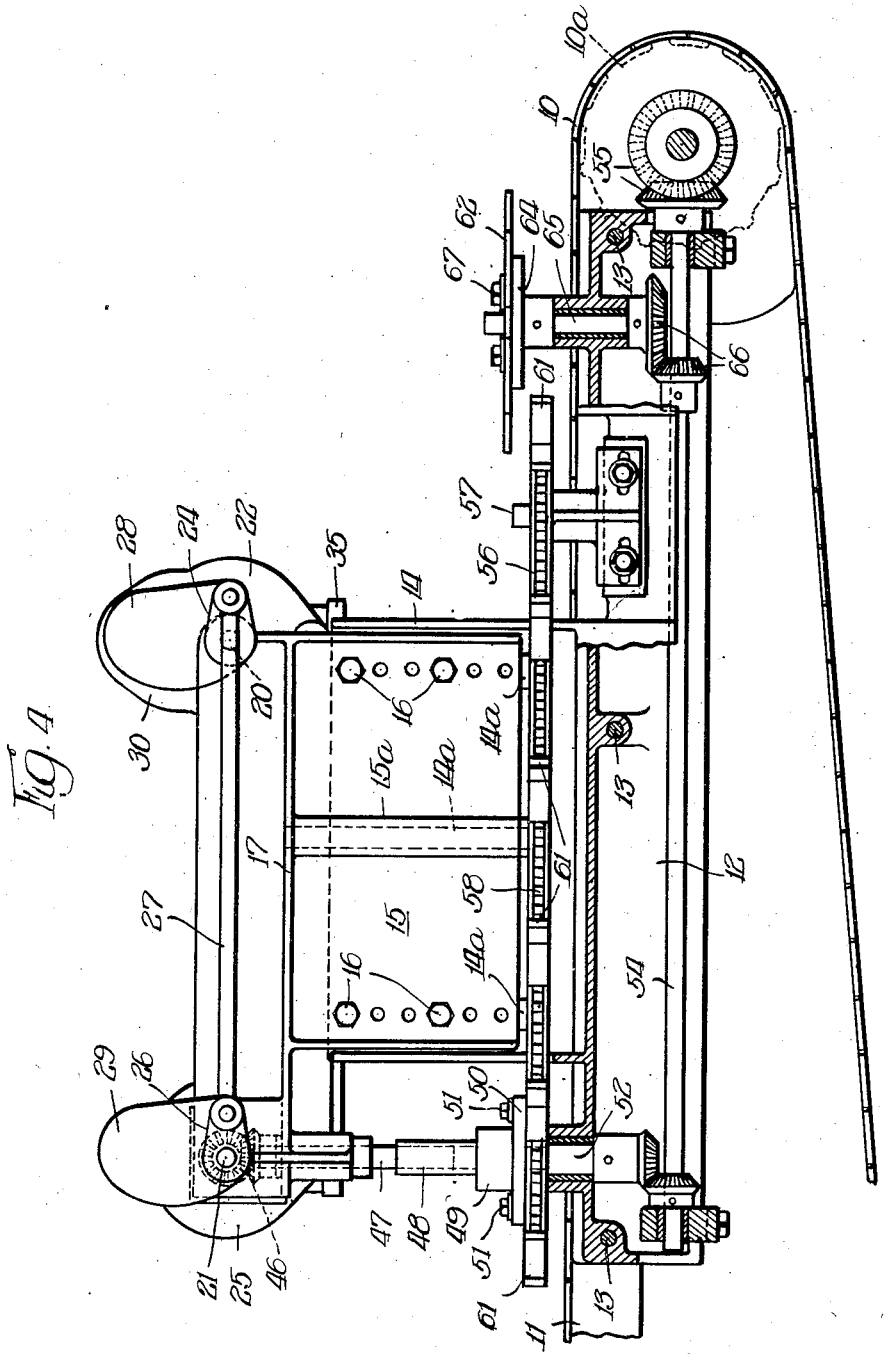
Fig. 4 is a rear elevational view of the machine with certain frame parts sectioned or broken away to show some of the driving mechanism.

The apparatus here shown is designed to be used in a canning line or packing line in which the various packing receptacles such as cans, jars, and the like, are filled to a suitable degree in any appropriate manner and are fed progressively in a series one after another to an appropriate apparatus for applying and sealing closures upon them. The direction of movement of the receptacles is from left to right in Fig. 1. The apparatus includes, or is associated with, a suitable conveyor here illustrated as an endless chain belt 10, which may serve also the capping machine and/or the filling machine, said conveyor travelling in part on a frame 11 on which the pressing apparatus is supported. As seen in Fig. 4, the machine includes a body frame 12 which is mounted on the conveyor frame 11 and has a hollow base portion in which most of the operating mechanism is housed, and an upstanding wall-like pedestal portion 14 which extends along the side of the conveyor 10 and to a considerable distance above it. This pedestal portion carries rearwardly or outwardly presented vertical splines or guide flanges 14a. An apron member 15 is supported on and adjustable vertically with respect to the pedestal portion 14, being secured thereto, in any selected vertical adjustment, by screws 16 and being guided in its vertical adjustment by engagement of a spline 14a in its channeled slideway 15a.

Adjacent its upper end, the apron member 15 carries a rearwardly presented flange 17 and two bearing housings 18 and 19 over respective ends of said flange. In the bearing housing 18 is journaled a short horizontal shaft 20, and in the housing 19 a similar horizontal shaft 21. At its inner end the shaft 20 carries a crank member 22 and at its outer end a crank arm 24. Likewise, the shaft 21 carries at its inner end a crank member 25 and at its outer end a crank arm 26. The crank arms 24 and 26 are connected by a connecting rod 27 which is journaled on them at their outer ends, and said crank arms also have eccentric counterweights 28 and 29 integrally formed on them, and the crank member 22 is likewise formed with an eccentric counterweight portion 30, all for a purpose hereinafter described. The crank member 22 carries a crank pin 31 and the crank member 25 carries a similar crank pin 32, which crank pins are angularly displaced from crank arms 24 and 26 about the axes of shafts 20 and 21 and extend to positions over the conveyor 10. These crank pins have bearing thimbles 33 splined to them and these thimbles are journaled in bearings 34 which are mounted on the end portions of a presser bar 35, said presser bar thus forming a connection between the crank members 22 and 25. Accordingly, when shaft 21 is rotated, shaft 20 will be likewise driven through the medium of presser bar 35 and connecting rod 27. The counterweights 28, 29 and 30 are provided for the purpose of counterbalancing the connecting rod 27 and the presser bar 35 and the parts carried thereby.

Figure 3:
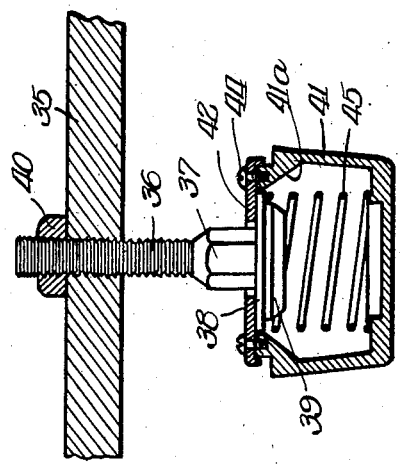
Fig. 3 is a detail illustrating one of the pressing heads or plungers in vertical section and on a larger scale than the other figures.

The presser bar 35 carries the pressing plungers which are equidistantly spaced relative to one another in alignment upon it. One of the pressing plungers is illustrated in detail in Fig. 3, where it will be seen that it includes a threaded shank portion 36 having a flatted head 37 and a disk 38 and a tapered boss 39 fixed thereon concentrically with the shank portion 36. The shank has screw thread engagement with the presser bar 35, passing through the latter and being provided with a jam nut 40 for clamping it in selected adjustment. The plunger also includes a presser head which comprises a cup-like member 41 having a downwardly tapering peripheral wall and a substantially flat bottom, and a hanger ring 42 which encompasses the shank portion 36 and rests upon the disk 38 with a clearance from the head 37. The cup-like member 41 is secured to the hanger ring in any suitable fashion permitting its being readily dismounted, as by screws 44. A pliant coil spring 45 bears at its upper end against the flange 38 around the boss 39 and at its lower end against the bottom of the cup-like member 41, thus having the effect of pressing the member 41 downwardly and holding the anchor ring 42 flat upon the flange 38, and also of permitting the pressing member, which comprises the cup-like portion 41 and anchor ring 42, to be moved upwardly relative to the shank portion if sufficient resistance is opposed to the cup member when the bar 35 and shank 36 are moving downwardly. The inner wall portion of the cup member 41 which is immediately under the anchor ring 42 is of such diameter as to receive the flange 38 fairly closely, and thus maintain the pressing head in concentric relationship with the shank 36. However, the clearance between the ring 42 and the head 37 is sufficient to permit the ring 42 to be moved upwardly to a tilted or canted position relative to the shank, as may occur when the pressing head is elevated by eccentrically applied pressure, and the upper inner wall portion 41a of the cup member 41 is of conic or upwardly converging form, so that when the presser head is returned by the spring 45 from an elevated or canted or eccentric position, said converging wall portion 41a will cooperate with the marginal portion of the flange 38 to guide the pressing head back to its normal concentric relationship with the shank. These various features are provided for the purpose of permitting the pressing head to accommodate itself to inaccurately positioned receptacles and avoid injury or upsetting of them, as will be pointed out hereinafter. In order that the apparatus may be adapted to receptacles of different diameters, sets of cup members 41 of different diameters are provided, and they may be interchangeably mounted on the anchor rings 42 as by means of the screws 44.

The shaft 20 is actuated from the shaft 21 through the medium of the crank disks 25 and 22 and bar 35 and connecting rod 27, which bar and rod, being angularly displaced relative to their shafts, maintain rotation of shaft 31 uniform with that of shaft 32 and also maintain uniformity in the level of the plungers 41 throughout the course of their orbital movement, and as shown in Fig. 4, shaft 21 is actuated, through the medium of bevel pinions 46, from a stub shaft 47 which is slidable in but splined to a vertically extending sleeve 48. This sleeve 48 is mounted in a hub 49 which is fastened concentrically on a sprocket wheel 50 (see Fig. 2) by means of screws 51 which pass through concentric arcuate slots 49a in the flange of the hub 49, so that the hub may be adjusted rotatably relative to the sprocket wheel 50 for a timing adjustment as hereinafter explained. The sprocket wheel 50 is fixed to a short vertical shaft 52 rotatably driven by horizontal shaft 54 which is disposed in the base housing and actuated from the conveyor sprocket 10a through the medium of an automatic slip clutch 53 and bevel pinions 55. Thus the presser bar 35 and the pressing heads will be operated in synchronism with the conveyor 10.

Entrained on the sprocket 50 and on a corresponding idler sprocket 56 which rotates on a journal 57, is an endless chain 58, the disposal of said sprockets and chain being such that the latter travels alongside and slightly above the conveyor belt 10 in front of the pedestal wall 14, and said wall 14 carries a forwardly projecting ledge member 60 which overhangs the chain in that location. At uniform intervals, having the same spacing as the pressing plungers on the bar 35, finger flights 61 are mounted on individual links of the chain 58 so as to project outwardly from the chain, and these flights have rearwardly extending heel or stop portions 61a adapted to bear against adjacent links of the chain to hold the projected finger portions in straight outwardly projecting positions when the flights are traveling between the sprockets 50 and 56. The chain 58 is driven from shaft 52 through the medium of sprocket 50, and hence operates in synchronism or timed relationship with shaft 21 and presser bar 35. This chain with its actuating mechanism and finger flights constitutes a positioning means for maintaining the proper spacing of receptacles presented to the presser heads on the conveyor 10.

A head of the sprocket 56 is a spacing star wheel 62 mounted on the flanged hub 64 of a short vertical shaft 65. This shaft is actuated from shaft 54 through the medium of bevel pinions 66 and hence the star 62 is rotated in timed relationship with the conveyor, the chain 58 and presser bar 35. The star wheel 62 is provided with pockets or recesses 62a at equidistant intervals circumferentially thereof, and is adjustable rotatably on hub 64 and may be locked in selected positions of adjustment by the screws 67 which pass through arcuate slots in the star and are threaded into said hub.

Along and above opposite sides of the conveyor chain 10 are disposed guide rails 68 and 69 (see Fig. 2), the latter being adjustable transversely of the conveyor belt by virtue of adjustable screws 70 which support it from brackets 71. The guide rail 68 is supported on the flange 60 and is adjustable laterally thereon toward and from the median line of the conveyor belt. The portion 69a of the guide rail which is opposite the star 62 is flexible or adjustable outwardly against the pressure of spring 72, said portion 69a of the rail being hinged at 74. The portions of the rails 68 and 69 which are opposite the pedestal wall 14 extend parallel with each other and parallel with the conveyor belt, but at a point approximately opposite the shaft 52 both of said rails are deflected laterally, as illustrated at 68a and 69b, for a purpose hereinafter explained. The star wheel 62 is demountable for interchangeability with others of a set, the different star wheels having pockets for feeding receptacles of different diameters.

The machine is adjusted for handling receptacles of a given size by mounting on the hub 64 the proper star wheel for that size and by adjusting the guide rails 68 and 69 to the proper spacing for guiding the receptacles in a row along the middle of the conveyor belt, and cup members 41 of proper size to enter the mouths of such receptacles are mounted on the anchor rings 42 as above described. The frame 15 is set at the proper vertical position on the pedestal plate 14, and adjustment of the shanks 36 in presser bar 35 is made to position the presser heads at the elevation from the conveyor belt 10 suitable to the height of the receptacles. After loosening the bolts 51 of the hub 49, the rotary positions of the sprockets 50 and 56 relative to shaft 48 are adjusted so that the flight fingers 61 will bear the proper relationship to the presser heads when the latter are in their lowermost position, that is, so that the finger flights adjacent respective plunger heads will be spaced from the centers of the shanks 36 by a distance equal to the outside radius of the receptacle. A similar rotary adjustment of the star wheel 62 on its hub is made so that it will position the successive receptacles ahead of the respective flight fingers.

Figure 2:
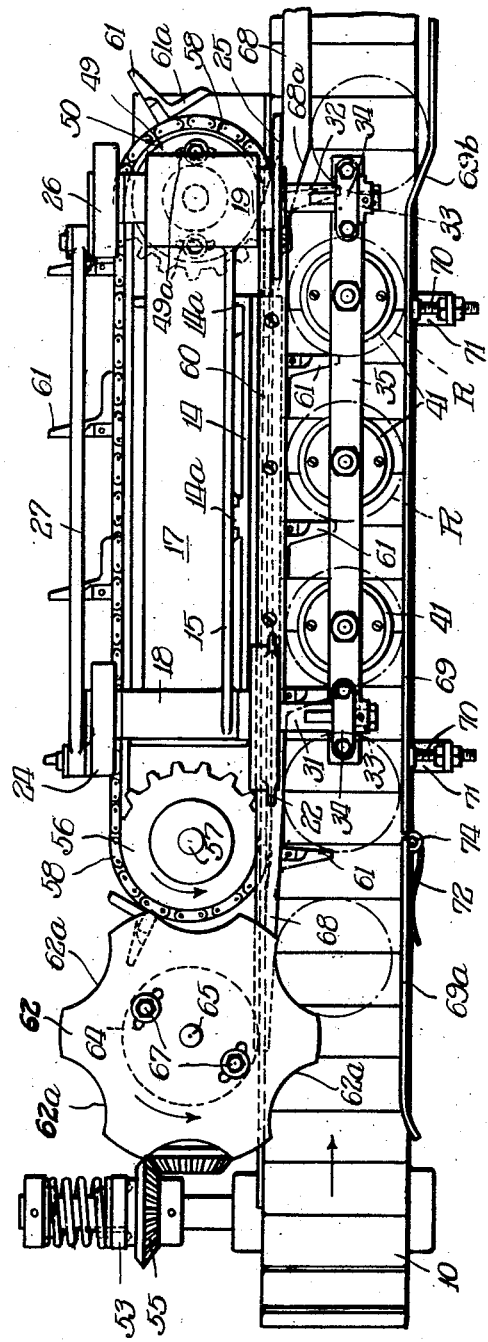
Fig. 2 is a top or plan view of same.

The filled receptacles are fed onto the conveyor belt at the end which is at the left in Fig. 2, and, the conveyor belt and other operating parts being actuated continuously, the successive receptacles will be picked up in the respective pockets of the star wheel, thus spacing them uniformly from one another, and will be fed forwardly with the movement of the conveyor belt and star wheel, so that each will be positioned ahead of an approaching flight finger. The flexibly mounted portion 69a of the guide rail eases the receptacles into proper positions in the star wheel pockets 62a and prevents their being crushed or jammed. The chain 58 with its flight fingers 61 travels slightly faster than the conveyor belt, so that contact of the fingers with the receptacles is maintained at all times. Meanwhile, the presser bar is being operated continuously to move the presser heads so that their bottoms revolve in respective vertical areas indicated approximately by the broken lines O, O' and O'' (the orbits of the center points of the presser heads being indicated by the circles K) and the timing of the chain 58 is such that the receptacles are brought to positions where the presser heads will enter their mouths as the presser heads descend, and will be advanced at the average speed of forward movement of the presser heads until the latter are withdrawn from them. The relationship of a receptacle to a presser head at the time the latter enters it, and the relative positions of the presser bar and crank member 22 at such time, are illustrated by the dot and dash lines in Fig. 1, and it will be observed that in the course of the movement of the plunger from the point of entry, which is illustrated in dot-and-dash lines, to the point of maximum penetration or depression, which is illustrated in full lines, the speed of the downward movement of the plunger is decelerated at the rate of a simple harmonic motion. Consequently, with the increase of the compression or compacting of the material in the container, the rate of the compressing movement is decreased, thereby allowing the pieces more time in which to adjust themselves to one another, thus to avoid crushing and mutilation of the material. The vertical adjustment of the frame 15 and of the shanks 36 on the presser bar 35 is such that the presser heads will enter the receptacles to the required distance for pressing down the contents and providing an unfilled head space of the desired depth. If there is superfluous fluid in a receptacle, the excess will simply be overflowed from the mouth of the receptacle by the intrusion of the presser head.

The three presser heads thus operate on three receptacles simultaneously, and during the time that the presser heads are clear of the receptacles, the three following receptacles are advanced to positions to receive them when they next descend. It is to be observed, accordingly, that the machine operates continuously and that the progressive movement of the receptacles is uninterrupted.

The offset at 68a and 69b in the guide rails is provided so that the movement of the receptacles will not be accelerated by the flight fingers when the latter start to turn about the sprocket 50. After the flight fingers leave the receptacles, the latter are carried progressively onward by the conveyor belt to the closure applying machine.

The yieldable mounting of the presser heads or cups 41 is for the purpose of preventing injury to receptacles, or upsetting of them, in event they are not accurately positioned on the conveyor for reception of the cups in their open mouths. Such a condition is not likely to occur, inasmuch as the guide rails 68 and 69 and the positioning fingers 61, which travel a trifle faster than the conveyor, are effective to position receptacles accurately under normal conditions, and under all conditions prevent displacement of the receptacles laterally on the conveyor or rearwardly from their proper positions. However, by some external interference, it is possible for a container to be displaced forwardly from contact with its positioning finger. In such a circumstance, the yieldable mounting of the presser head permits it to move upwardly on the shank or post 36 which supports it, in event it comes down onto the rim of the receptacle instead of within the mouth thereof.

It will be observed that there is very little possibility for any of the operating mechanism which operates the presser bar and presser heads to be splashed or fouled by material from the receptacles, as all of such mechanism is spaced a substantial distance from the receptacles and the presser heads which enter them. Moreover, all of the operating parts are accessible at all times for inspection and cleaning so that the apparatus may be maintained in an entirely sanitary condition. Moreover, there is no necessity for carrying free lubricant on any of the moving parts, and hence the possibility of lubricant dripping or working onto the presser heads is avoided. Lubrication of the various journals may be accomplished by use of self-lubricating bearings of well known type.

It is to be observed, moreover, that the machine is entirely self-contained, being carried in its entirety on the base frame 12, and may be mounted upon or removed from the conveyor frame 11 as a unit and in accordance with the requirements of the particular canning job in hand at any time.

What I claim is:

1. In a topping machine for use in canning, a pressing plunger comprising a rigid post, a presser head movably mounted on the post and adapted to enter the mouth of a receptacle disposed in coaxial alignment therewith, and means normally maintaining said presser head in concentric relationship with said post, said means including a resilient element yieldable to permit the presser head to move longitudinally of the post and to canted relationship to the post and aligned receptacle.

2. In a topping machine for use in canning, a pressing plunger comprising a rigid post, an anchor ring movably mounted on the post, a cup member mounted on the anchor ring and movable therewith, said cup member having a portion adapted to enter the mouth of a receptacle coaxially aligned with the post, means for centering the cup member on the post and including resilient means cooperating with the post and cup member to permit the latter to move longitudinally and eccentrically relative to the post and aligned receptacle.

3. In a topping machine for use in canning, a pressing plunger comprising a rigid post having an outwardly projecting ledge at one end, an anchor ring movably mounted in encompassing relationship to the post and adapted to rest upon said ledge in normal relationship to the post, a cup member demountably supported on the anchor ring and housing said ledge, said cup member having a portion adapted to enter the mouth of a receptacle coaxially aligned with the post, and resilient means housed by the cup member and cooperating with it and the post to hold the anchor ring in normal position on the ledge yet permit it to be moved longitudinally of the post and to canted relationship with the post and aligned receptacle.

4. In a topping apparatus for use in association with a conveyor which is operable to feed packing receptacles progressively, the combination of a support, a pair of shafts mounted for rotation thereon on horizontal axes, a crank member carried on each of said shafts, a crank arm carried on each of said shafts, a presser bar disposed in horizontal position over the conveyor and journaled on both of said crank members, a connecting rod journaled on each of said crank arms at locations displaced angularly about the shafts from the journal axes of said presser bar, a plurality of pressing plungers mounted on the presser bar, and means for rotating one of said shafts thereby to revolve said presser bar in a vertical orbit over the conveyor.

5. In a topping apparatus for use in association with a conveyor which is operable to feed packing receptacles progressively, the combination of a support, a pair of shafts mounted for rotation thereon on horizontal axes, a crank member carried on each of said shafts, a crank arm carried on each of said shafts, a presser bar disposed in horizontal position over the conveyor and journaled on both of said crank members, a connecting rod journaled on each of said crank arms at locations displaced angularly about the shafts from the journal axes of said presser bar, a plurality of pressing plungers mounted on said presser bar in a series running longitudinally over the conveyor, and means for rotating one of said shafts thereby to revolve said pressing plungers in respective vertical orbits over the conveyor.

LYNN E. DAVIES.